United States Patent [19]

Olivier

[11] Patent Number: 4,479,682
[45] Date of Patent: Oct. 30, 1984

[54] ROLLER BEARING COMPRISING A LUBRICATING DEVICE FOR AN INNER RACEWAY

[75] Inventor: Jean-Marie R. Olivier, Saint Pierre Du Perray, France

[73] Assignee: Societe Nationale Detude et de Construction de Moteurs D'Aviation, Paris, France

[21] Appl. No.: 533,631

[22] Filed: Sep. 20, 1983

Related U.S. Application Data

[63] Continuation of Ser. No. 232,684, Feb. 9, 1981, abandoned.

[30] Foreign Application Priority Data

Feb. 12, 1980 [FR] France .................... 80 03007

[51] Int. Cl.³ .................... F16C 33/66; F16N 7/36
[52] U.S. Cl. .................... 384/475
[58] Field of Search ............ 60/39.08; 184/6.11; 308/187

[56] References Cited

U.S. PATENT DOCUMENTS

| | | | |
|---|---|---|---|
| 2,998,287 | 8/1961 | Pritchett | 308/187 |
| 3,628,835 | 12/1971 | Cornish et al. | 308/187 |
| 3,722,967 | 3/1973 | Lewis | 308/187 |
| 3,811,743 | 5/1974 | Wren | 308/187 |
| 3,915,521 | 10/1975 | Young | 308/187 |
| 4,265,334 | 5/1981 | Benhase, Jr. | 60/39.08 X |
| 4,286,829 | 9/1981 | Heemskerk | 308/187 |
| 4,334,720 | 6/1981 | Signer | 308/187 |
| 4,342,489 | 8/1982 | Lenz et al. | 308/187 |

FOREIGN PATENT DOCUMENTS

| | | |
|---|---|---|
| 2351197 | 5/1974 | Fed. Rep. of Germany . |
| 1025571 | 4/1953 | France . |
| 1130655 | 2/1957 | France . |
| 1179305 | 5/1959 | France . |
| 2039247 | 1/1971 | France . |
| 907143 | 10/1962 | United Kingdom . |

Primary Examiner—John M. Jillions
Assistant Examiner—Daniel P. Stodola
Attorney, Agent, or Firm—Bacon & Thomas

[57] ABSTRACT

A bearing, of the type comrising an inner race and an outer race, and a plurality of rollers uniformly distributed and located between the inner and outer races, a lubricant forming a film on the outer raceway is forced to penetrate holes drilled axially into the outer race, which conduct the lubricant toward one or more passageways to apply it to the inner raceway of the bearing. The outer race of the bearing also has a plurality of holes extending obliquely to permit the recycling of the lubricant.

7 Claims, 6 Drawing Figures

ROLLER BEARING COMPRISING A LUBRICATING DEVICE FOR AN INNER RACEWAY

This application is a continuation of application Ser. No. 232,684, filed Feb. 9, 1981, now abandoned.

BACKGROUND OF THE INVENTION

The present invention concerns a roller bearing with a lubricating device for the inner raceway.

It concerns more particularly the case wherein for technical reasons it is impossible or very difficult to directly lubricate the inner raceway of the bearing.

It is known that roller bearings of the type used in gas turbines of aircraft engines to support a first shaft with respect to a second shaft contain an inner race mounted on the first shaft, an outer race mounted in a bore of the second shaft and rollers located between the inner and the outer races spaced regularly by a separator or cage.

The solution generally used for the lubrication of such bearings consists of introducing the lubricant directly to the inner raceway by means of jets or through a bore of the inner shaft. Under the effort of the centrifugal force, the lubricant is forced toward the outer raceway of the bearing so that the latter is suitably lubricated.

As an example of this solution, the roller bearings described in U.S. Pat. No. 3,722,967, filed Oct. 26, 1971, in the name of Harry L. LEWIS, may be cited.

This patent describes a bearing containing a device for the lubrication of the inner raceway. Oil, coming from a storage reservoir, is projected onto the inner raceway at the base of the rollers. Under the effect of the centrifugal force, the oil passes through the cage which maintains the regular spacing of the rollers and is deposited on the external raceway of the bearing.

It is then recovered in circular grooves provided on the outer race and recycled to tlhe storage reservoir.

However, it is not always possible to conduct the lubricant to the inner raceway of the bearing, particularly in certain advanced turbojet engines wherein an intershaft roller bearing effects the centering of the high pressure spool on the low pressure spool. It is therefore necessary to apply the lubricant to the external raceway, which under these conditions is suitably lubricated. In contrast, the inner raceway is poorly lubricated and the removal of heat is not assured, the more so since the centrifugal force is opposed to the motion of the oil from the outer raceway to the inner raceway.

SUMMARY OF THE INVENTION

The invention concerns a roller bearing including a lubricating device for the inner raceway, which eliminates the above-mentioned disadvantages.

A roller bearing, supporting in rotation a first shaft with respect to a second shaft and comprising an inner race mounted on the first shaft, an outer race mounted in a bore of the second shaft and regularly spaced rollers located between the inner and the outer races, each race containing a raceway for the rollers, a lubricant applied in a known manner to the outer raceway and forming a film of oil on said outer raceway, is characterized by the pressure resulting from the passage of the rollers on the outer raceway forcing the lubricant through holes drilled, at a regular spacing, in the outer race, said holes conducting the lubricant toward means to direct it to the inner raceway, with the outer race further containing holes, drilled in a regular distribution in the outer race, to conduct the lubricant from said outer raceway toward the bore of said second shaft, from where it is returned to the general lubricant circulation by recuperating pumps in the enclosures of the bearing.

According to a first embodiment, the means to apply the lubricant to said inner raceway consist of two axially spaced guide plates integral with the outer race, said guide plates defining an annular space wherein the lubricating fluid penetrates through holes, and containing a plurality of orifices located in the immediate proximity of the inner raceway to direct the lubricating fluid onto said inner raceway, and means to prevent the return of said fluid being provided in said annular space.

According to this embodiment, the means to prevent the return of the lubricant consist of a membrane check valve.

In a variant, the two guide plates contain a plurality of orifices located under the end of the inner race to direct the lubricating fluid toward longitudinal grooves provided in the underside of said race in communication with a plurality of radial holes opening onto the inner raceway.

According to a second embodiment, the means to conduct the lubricant onto the said inner raceway consist of a plurality of individual jets mounted on the outer race and regularly distributed thereon, each jet containing an orifice directing the lubricating fluid onto the inner raceway, the means to prevent the return of the lubricant consisting of a spring loaded ball check valve.

According to a third embodiment, the means to prevent the return of the lubricant consist of diaphragms having a different drop in pressure depending on whether the flow is in one direction or the other.

BRIEF DESCRIPTION OF THE DRAWINGS

The characteristics and advantages of the present invention will appear more readily following the description hereinafter of embodiments described for the purpose of explanation and without limiting the invention in any manner, with reference to the drawings attached hereto, wherein.

DESCRIPTION OF THE PREFERRED EMBODIMENTS

Figure 1:
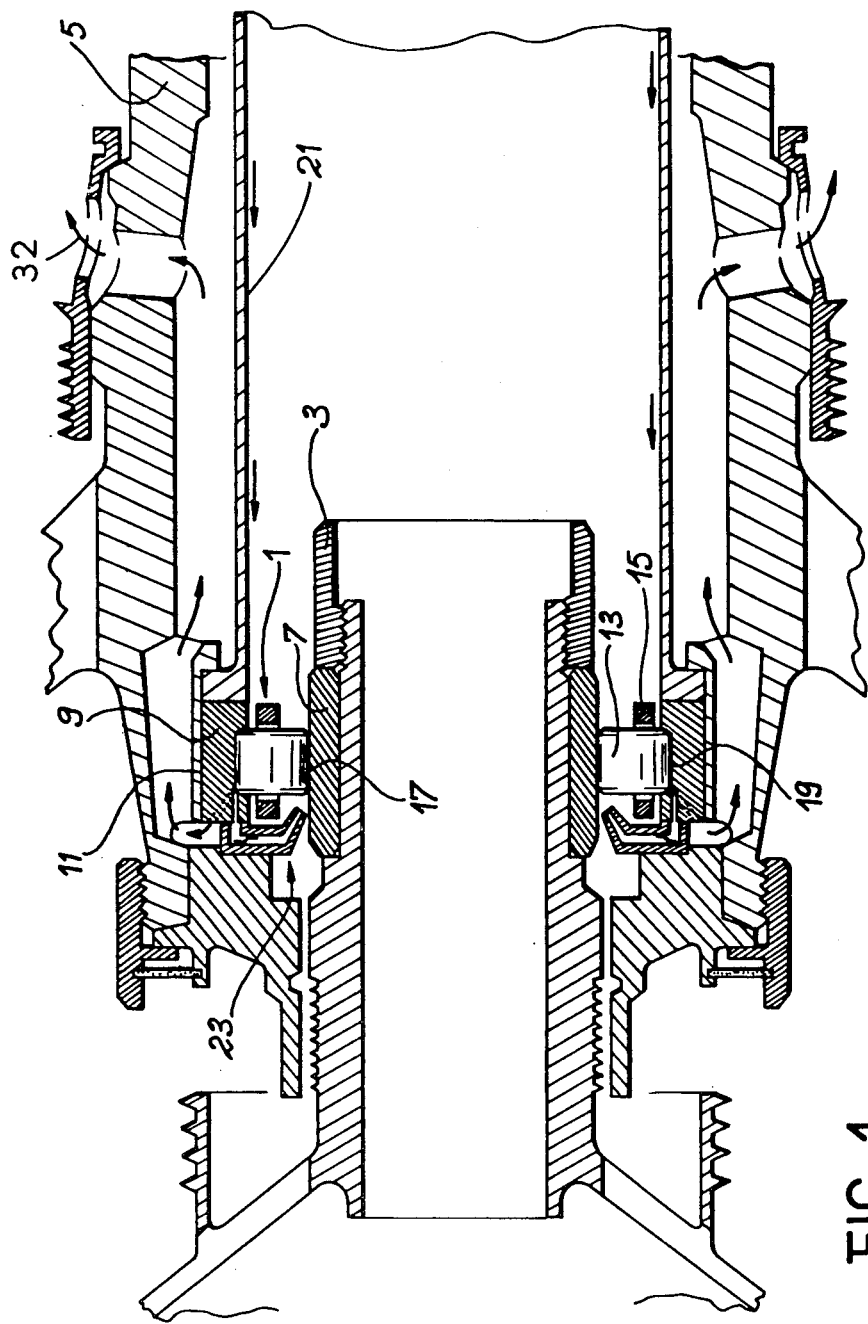
FIG. 1 is a sectional view of a bearing according to the invention, with a first embodiment of the means to prevent the recycling of the lubricant.

In FIG. 1, a sectional view of a bearing according to a first embodiment of the invention is shown, designated by the general reference symbol 1, located between a first shaft 3 and a second shaft 5. The bearing 1 comprises an inner race 7 mounted on the first shaft 3, an outer race 9 mounted in a bore 11 of the second shaft 5. The rollers 13 maintained in regular spacing by the cage 15 are located between the inner race 7 and the outer race 9. During rotation of the shaft 3 with respect to the shaft 5, the rollers 13 roll on the inner and outer raceways, at the surfaces designated respectively by the numerals 17 and 19.

It is in the case where the bearing 1 is mounted in an assembly having a design of such complexity that it does not permit the direct lubrication of the inner raceway 17, that the invention is particularly advantageous.

In this case, the lubricant 21 is applied to the outer raceway 19 by means of a jet (not shown). This situation is present in particular in the case of certain advanced turbojet engines, wherein an intershaft roller bearing assures the centering of the high pressure spool on the low pressure spool. The bearing of the invention contains a lubricating device 23 for the inner raceway 17. This device is shown in detail in FIG. 2.

Figure 2:
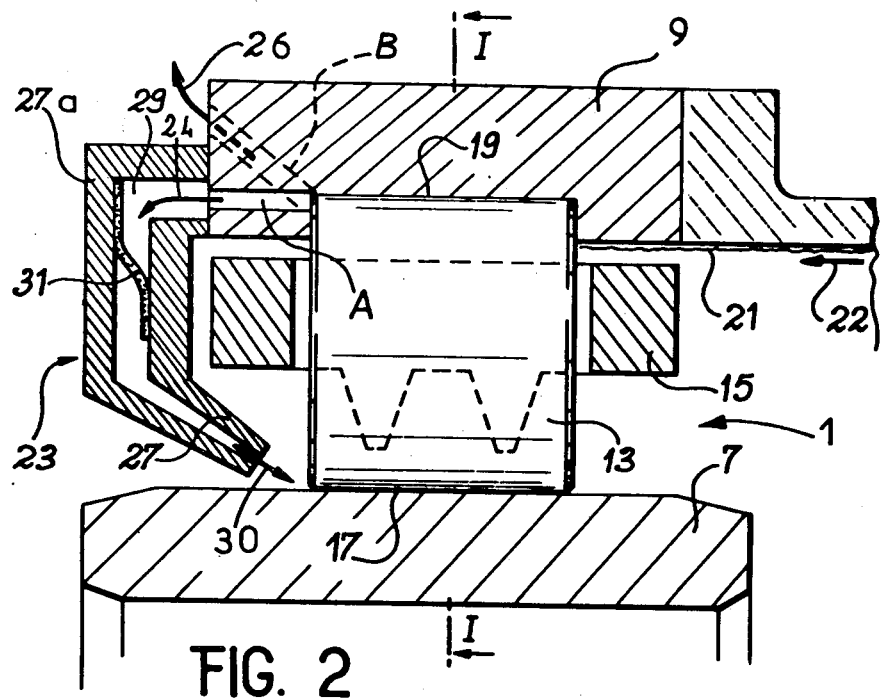
FIG. 2 is an enlarged view of a detail of the bearing shown in FIG. 1.

In FIG. 2, a view of a detail of the bearing 1 of FIG. 1 is shown, together with the lubricating device 23 for the inner raceway 17. The device 23 comprises a plurality of holes A, drilled axially in the outer race 9 and distributed regularly around its periphery. In this embodiment, the number n of the holes A may be equal to the number N of the rollers. According to a variant of the embodiment, the number n of the holes A may be equal to N/2 or another submultiple of N. But, in no case may n be greater than N. In fact, as shall be seen hereinafter, if there should be more holes A than rollers, the lubricating circuit under pressure would be able to recycle upon itself and the inner raceway 17 would be poorly supplied with the lubicant 21, consisting of oil in the present example.

According to the invention, the bearing 1 also contains means for conducting the lubricant 21 onto the inner raceway 17.

In the embodiment shown, these means consist of two guide plates 27 and 27a, spaced axially and integral with the outer race 9, said guide plates defining between them an annular space 29 wherein the lubricant from the holes A is received. Between the two guide plates 27, 27a, there are means to prevent the return of the lubricant 21. These means, designated by the reference 40 in FIG. 2, consist of a membrane check valve.

Figure 4:
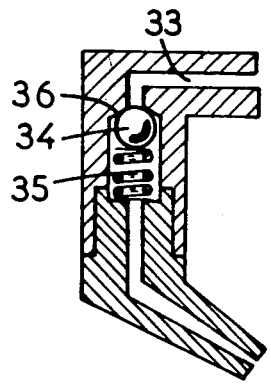
FIG. 4 is a view of a detail of a second embodiment of the means to prevent the recycling of the lubricant.

According to a second embodiment, shown in FIG. 4, of the means to prevent the return of the lubricant, each hole A opens into a corresponding hole 33 of an individual anti-return jet device, consisting of a ball 34, resting on a seat in the form of a cone 36, supported for example by a spring 35. In this case, the number n of the holes A may differ from the number N of the rollers, or from a submultiple of N, because the individual anti-return system prevents the recycling of the oil, in contrast to the first embodiment.

Figure 5:
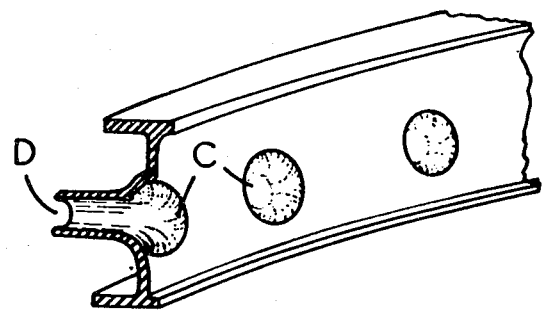
FIG. 5 is in a partial perspective a view of a detail of a third embodiment of said means.

According to a third embodiment, shown in FIG. 5, of the means to prevent the recycling of the lubricant, a plurality of diaphragms is provided for example in a ring placed in the space 29. Their inlets C face the holes A and have a smooth profile. Their outlets D, in contrast, have an angular profile. Consequently, the turbulence generated by them in the case of a reflux has a tendency to restrict the flow from D to C, as the inlets A do not face the wedges of oil 25 (FIG. 3), while the flow of C toward D is much less restricted, as the inlets A face the wedges 25 of the oil. In this embodiment, the number n of the holes A is equal to the number N of the rollers or to a submultiple of N.

As in the first embodiment, this condition is necessary to prevent recycling; it is in fact necessary that all of the holes A face the wedges 25 of the oil simultaneously. If some of the holes A would face the intervals between the wedges of oil, because of the intercommunication through the chamber 29 between the holes A placed under pressure by the oil wedges, and the other holes A not under pressure, the lubricant would be recycled to the outer raceway 19, instead of being conducted under pressure against the centrifugal force to the inner raceway by the device 23. In a variant, not shown, diaphragm acting preferentially in the C, D direction are individually connected with the holes A (without passing through a common chamber 29) and the condition $N=N$ or a submultiple of N is not compulsory.

In each of the embodiments described hereinabove, the outer race 9 further contains a series of holes B, shown drilled in an oblique manner (FIB. 2). In fact, their position, their orientation and their general arrangement should be such that they do not communicate with the supply circuit or circuits of the inner raceway 17 upstream from the holes A. In the embodiment shown (FIG. 3), the number n' of holes B is equal to that of the holes A, each hole B being located between two holes A and at an equal distance from them.

In a further embodiment, not shown, n' may be different from n; for example, there may be two holes B in each interval between the holes A or, in contrast, a hole B once for two intervals between the holes A.

Even though it has been specified hereinabove that in the second embodiment corresponding to FIG. 4, the number n of holes A and the number n' are independent of the number of rollers, it should be noted that it may be advantageous to have, particularly with regard to n, a sufficiently large number of holes to distribute the lubricant well over the inner raceway and to adjust the number n' of the holes B and/or their diameter so as to prevent the accumulation of oil on the outer raceway.

The operation of the bearing according to the invention is as follows, the operation being described in detail for the first embodiment only, as said operation may be readily deduced from it for the other cases.

The lubricant 21 is propelled in a known manner in the direction of the arrow 22 by a jet (not shown), toward the outer raceway 19, upon which it forms a film. A wedge of oil 25 is formed in advance of each roller 13, between the roller itself and the outer raceway 19, as may be seen in FIG. 3.

It has been observed that the pressure at the apex of the wedge 25 may attain several hundreds bars. Under the effect of this pressure, the lubricant 21 penetrates, at the instant of the passage of the roller 13, into the holes A. It then penetrates, according to the arrow 24 of FIG. 2, into the annular cavity 29, in order to subsequently arrive, according to the arrow 30, on the inner raceway 17, which is thereby lubricated.

In a manner identical with that described for the holes A, the lubricant 21 is forced into the holes B, when the wedge of oil 25 formed in advance of each roller 13 passes in front of a hole B. The lubricant applied to the inner raceway 17 is re-centrifuged toward the outer raceway 19. The lubricant centrifuged in this manner is intermixed with the oil arriving according to the arrow 22. Part of this oil exits through the holes B according to the arrow 26 (FIG. 2) toward holes drilled in the second shaft 5, inside of which the outer ring 9 is mounted. This lubricant is finally recovered according to the arrows 32, from where it is returned to the general lubricating circuit by recuperating pumps in the housing of the bearings.

Figure 6:
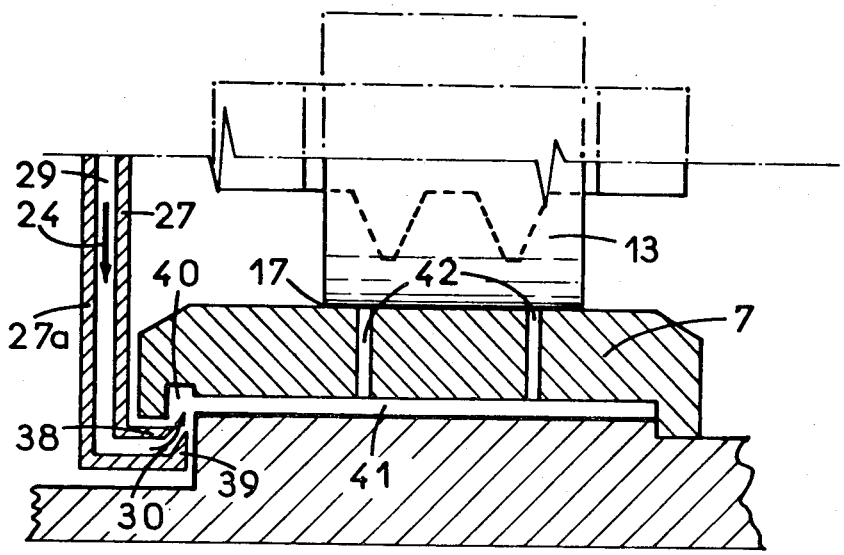
FIG. 6 shows a view of a detail of the first embodiment, demonstrating a variant of the means of distribution of the lubricant on the inner raceway.

A view of a detail showing a variant of the embodiment of the bearing 1 represented in FIG. 2, is given in FIG. 6. The two guide plates 27, 27a are extended facing the inner race 7 and form with their parts 38 and 39 an orifice located under a circular groove 40 located in the vicinity of the end of said race. The race 7 also has on its internal face a plurality of longitudinal grooves 41, which communicates with the said circular groove 40 and with radial holes 42 which open onto the inner raceway 17.

The operation of the bearing remains the same and is in conformity with the invention. But the lubricant, beginning at the annular cavity 29, is distributed at the inlet of the grooves 41 to subsequently arrive through the holes 42 on the raceway 17, which is thus lubricated.

Figure 3:
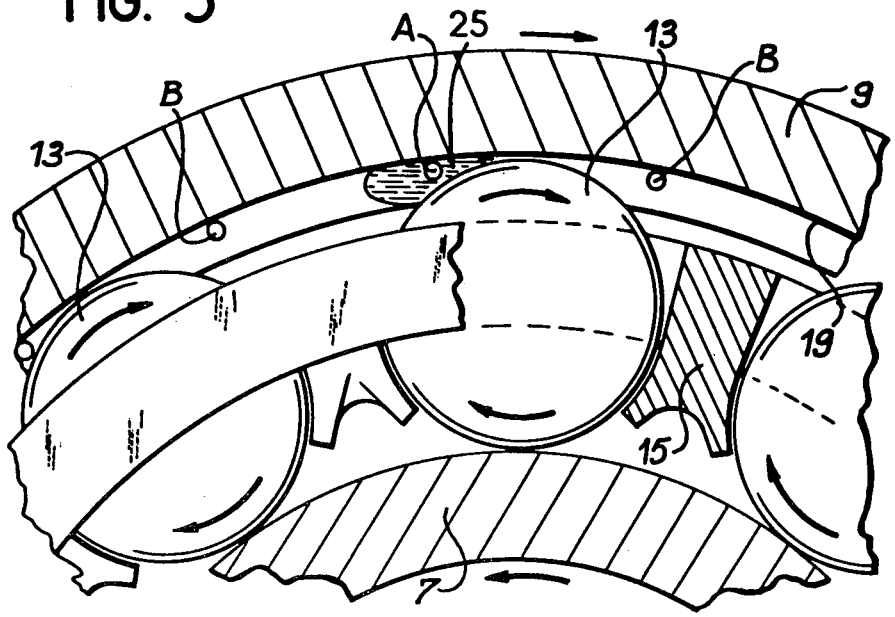
FIG. 3 is a cross section on I—I of the bearing shown in FIG. 2.

FIG. 3 shows a sectional view on the line I—I of FIG. 2, in the case of the first embodiment of the means to prevent the return of the lubricant. In this variant, the number N of the rollers is equal to the number n of the holes A and consequently to the number n' of the holes B, as the holes A and B are equal in number. As the result of this design, all of the oil wedges 25 formed in advance of the rollers 13 pass simultaneously in front of the holes B.

According to a variant embodiment, a number n of the holes A and correlatively of the holes B, equal to one-half of the number N of the rollers may be provided. With this configuration, when a wedge of oil 25 passes in front of a hole A, the wedge of oil formed in advance of the immediately preceding and following rollers is facing a hole B. The lubricant 21 is thus simultaneously directed toward the inner raceway 16 and toward the oil return.

It should be recalled that in this embodiment the number n must not be higher than N, but is equal to a submultiple of n, with the understanding that n=N is included.

The return of the oil through the holes B has a double advantage. Firstly, it prevents the constant recycling of the lubricant upon itself and thus its rapid degradation. On the other hand, the automatic discharge of the pressure exercised on the rollers 13 by the oil wedges 25 extends the life of the inner raceway 17, as the latter is exposed to a reduced stress, which may be further varied by adjusting the diameter of the holes B or their number.

It is thus seen that the bearing designed according to the invention assures the flow of lubricant to the inner raceway 17 by providing an active lubrication of said inner raceway, provides for an improved removal of heat and a greater homogeneity of temperatures of the inner race 7 and the outer race 9.

It should be understood that the present invention is not limited to the embodiments and modes of utilization described hereinabove. Specifically, the holes A have been shown to be parallel to the axis of rotation of the shafts, but they may be drilled with a tangential and/or radial inclination, same as the holes B. Similarly, the check valves of the second mode of embodiment are represented with springs supporting balls on cones to form the anti-return device. In certain embodiments, the spring may be eliminated, the centrifugal force being sufficient to maintain the balls on their corresponding cones.

I claim:

1. In an intershaft roller bearing for use in a turbojet engine supporting a first rotating shaft for rotation relative to a second rotating shaft, the bearing having an inner race on the first shaft, an outer race mounted in a bore of the second shaft and defining an outer raceway, a plurality of rollers contacting the inner and outer races, and means to supply a lubricant to the outer race, the improvements comprising: (a) a plurality of first holes through the outer race extending in an axial direction and distributed regularly about the periphery of the outer race; the holes communicating with the outer raceway; (b) a plurality of second holes through the outer race extending in an oblique direction and communicating between the outer raceway and means to return lubricant to the lubricant supply; and, (c) means attached to the outer race and communicating with the plurality of first holes to direct lubricant to the inner race to lubricate and cool same, the lubricant being forced through the plurality of first holes and the means to direct it onto the inner race by an increased pressure in a wedge of oil formed in front of the rollers as the rollers rotate with respect to the outer race.

2. The improved roller bearing according to claim 1 wherein said means for directing said lubricant to said inner raceway comprises: (a) two guide plates axially spaced apart from each other and attached to the outer race, the guide plates defining an annular space therebetween which communicates with and receives lubricating fluid from the plurality of first holes, the guide plates also defining a plurality of outlet orifices located in the immediate vicinity of the inner raceway to direct the lubricating fluid onto said inner raceway; and, (b) means in the annular space to prevent the return of lubricating fluid to the plurality of first holes.

3. The improved roller bearing according to claim 2, wherein the means to prevent the return of the lubricant comprises a membrane check valve.

4. The improved roller bearing according to claim 1, wherein the means for directing the lubricant to the inner raceway comprises: (a) two axially spaced apart guide plates attached to the outer race and defining an annular space therebetween which communicates with and receives lubricating fluid from the plurality of first holes, the guide plates also defining a plurality of outlet orifices located radially inwardly of an end of the inner race to direct the lubricating fluid to the inner face of said inner race; (b) a plurality of longitudinal grooves defined by the inner face of the inner race; (c) a plurality of radial holes defined by the inner race and extending through said inner race from said longitudinal grooves and which open onto the inner raceway; and, (d) means in the annular space to prevent the return of the lubricating fluid to the plurality of first holes.

5. The improved roller bearing according to claim 4, wherein the means to prevent the return of the lubricant comprises a membrane check valve.

6. The improved roller bearing according according to claim 1 wherein the means to direct the lubricant to the inner raceway comprises jets individually mounted on the outer race and uniformly distributed thereon, each individual jet defining an orifice and having a check valve with balls biased against a seat by a spring, said jets directing the lubricating fluid onto the inner raceway.

7. Roller bearing according to claim 1 wherein the means for directing the lubricant to said inner raceway (17) comprises a rim carried by the outer race (9) and a plurality of diaphragms (C-D) circumferentially arranged on the rim so as to favor the flow in the direction from the outer race to the inner race.

* * * * *